US008980076B1

(12) United States Patent
Homola et al.

(10) Patent No.: US 8,980,076 B1
(45) Date of Patent: Mar. 17, 2015

(54) ELECTRO-DEPOSITED PASSIVATION COATINGS FOR PATTERNED MEDIA

(71) Applicant: WD Media, Inc., San Jose, CA (US)

(72) Inventors: Andrew Homola, Naples, FL (US); Chunbin Zhang, Fremont, CA (US); Paul C. Dorsey, Sunnyvale, CA (US); David Treves, Palo Alto, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 13/740,010

(22) Filed: Jan. 11, 2013

Related U.S. Application Data

(62) Division of application No. 12/472,288, filed on May 26, 2009, now abandoned.

(51) Int. Cl.
*C25D 5/02* (2006.01)
*C25D 7/00* (2006.01)
*G11B 5/31* (2006.01)

(52) U.S. Cl.
CPC ..................................... *G11B 5/31* (2013.01)
USPC ......................................... 205/119; 205/122

(58) Field of Classification Search
USPC .......................................................... 205/119
See application file for complete search history.

(56) References Cited

U.S. PATENT DOCUMENTS

| | | | | |
|---|---|---|---|---|
| 3,969,195 | A | * | 7/1976 | Dotzer et al. ................. 205/103 |
| 4,238,385 | A | * | 12/1980 | Okado et al. .................. 523/443 |
| 4,420,365 | A | * | 12/1983 | Lehrer .......................... 438/702 |
| 4,482,418 | A | | 11/1984 | Rigby |
| 4,935,278 | A | | 6/1990 | Krounbi et al. |
| 5,700,523 | A | | 12/1997 | Petrole et al. |
| 5,723,033 | A | * | 3/1998 | Weiss ....................... 204/192.15 |
| 6,013,161 | A | | 1/2000 | Chen et al. |
| 6,063,248 | A | | 5/2000 | Bourez et al. |
| 6,068,891 | A | | 5/2000 | O'Dell et al. |
| 6,086,730 | A | | 7/2000 | Liu et al. |
| 6,099,981 | A | | 8/2000 | Nishimori |
| 6,103,404 | A | | 8/2000 | Ross et al. |
| 6,117,499 | A | | 9/2000 | Wong et al. |
| 6,136,403 | A | | 10/2000 | Prabhakara et al. |
| 6,143,375 | A | | 11/2000 | Ross et al. |
| 6,145,849 | A | | 11/2000 | Bae et al. |
| 6,146,737 | A | | 11/2000 | Malhotra et al. |
| 6,149,696 | A | | 11/2000 | Jia |

(Continued)

FOREIGN PATENT DOCUMENTS

| | | |
|---|---|---|
| WO | 2008062772 | 5/2008 |
| WO | 2009101983 | 8/2009 |

OTHER PUBLICATIONS

Myasoedov, V.E., et al. "Manufacture of silicate enamel coatings by pulsed electrodeposition" Glass and Ceramics, vol. 51, Nos. 3-4, 1994.*

(Continued)

*Primary Examiner* — Keith Hendricks
*Assistant Examiner* — Stefanie S Wittenberg

(57) ABSTRACT

A method of fabricating a magnetic recording disk including providing a magnetic recording layer having a pattern of raised areas and recessed areas formed thereon and providing a mask layer on the raised areas of the magnetic recording layer. The method further including electrodepositing a first protection layer on the magnetic recording layer, removing the mask layer, and depositing a second protection layer above the first protection layer.

13 Claims, 3 Drawing Sheets

(56) References Cited

U.S. PATENT DOCUMENTS

| | | |
|---|---|---|
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,680,079 B1 | 1/2004 | Stirniman et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,821,627 B2 | 11/2004 | Stirniman et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,112,377 B2 | 9/2006 | Itoh et al. |
| 7,119,990 B2 | 10/2006 | Bajorek et al. |
| 7,147,790 B2 | 12/2006 | Wachenschwanz et al. |
| 7,150,844 B2 | 12/2006 | Deeman et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,300,595 B2 | 11/2007 | Suwa et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,314,833 B2 | 1/2008 | Kamata et al. |
| 7,320,584 B1 | 1/2008 | Harper et al. |
| 7,323,258 B2 | 1/2008 | Kamata et al. |
| 7,329,114 B2 | 2/2008 | Harper et al. |
| 7,341,825 B2 | 3/2008 | Bandic et al. |
| 7,351,484 B2 | 4/2008 | Wang et al. |
| 7,375,362 B2 | 5/2008 | Treves et al. |
| 7,378,029 B2 | 5/2008 | Hattori et al. |
| 7,385,785 B2 | 6/2008 | Hattori et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,572,528 B2 | 8/2009 | Yamamoto et al. |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |

(56) References Cited

U.S. PATENT DOCUMENTS

| | | |
|---|---|---|
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 2001/0055700 A1 | 12/2001 | Dykes et al. |
| 2002/0030949 A1* | 3/2002 | Itoh et al. .................... 360/322 |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0086795 A1 | 4/2005 | Suwa et al. |
| 2005/0120545 A1 | 6/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0211566 A1 | 9/2005 | Tomita et al. |
| 2005/0263401 A1 | 12/2005 | Olsen et al. |
| 2005/0271819 A1 | 12/2005 | Wago et al. |
| 2006/0063336 A1* | 3/2006 | Triyoso et al. ................ 438/287 |
| 2006/0093863 A1 | 5/2006 | Tsuchiya et al. |
| 2006/0147758 A1 | 7/2006 | Jung et al. |
| 2006/0181697 A1 | 8/2006 | Treves et al. |
| 2006/0207890 A1 | 9/2006 | Staud |
| 2006/0222897 A1 | 10/2006 | Kamata |
| 2006/0231409 A1* | 10/2006 | Sakamoto et al. ........... 205/292 |
| 2007/0026265 A1 | 2/2007 | Sakurai et al. |
| 2007/0054153 A1 | 3/2007 | Dai et al. |
| 2007/0070549 A1 | 3/2007 | Suzuki et al. |
| 2007/0245909 A1 | 10/2007 | Homola |
| 2008/0026252 A1 | 1/2008 | Sonoda et al. |
| 2008/0075845 A1 | 3/2008 | Sonobe et al. |
| 2008/0085362 A1 | 4/2008 | Yen et al. |
| 2008/0093760 A1 | 4/2008 | Harper et al. |
| 2008/0187779 A1 | 8/2008 | Horiguchi |
| 2009/0117408 A1 | 5/2009 | Umezawa et al. |
| 2009/0136784 A1 | 5/2009 | Suzuki et al. |
| 2009/0162704 A1 | 6/2009 | Kimura et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0059476 A1* | 3/2010 | Yamamoto et al. ............. 216/22 |
| 2010/0067144 A1 | 3/2010 | Tagami |
| 2010/0103559 A1 | 4/2010 | Sato |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0001423 A1 | 1/2011 | Natori et al. |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |

(56) References Cited

U.S. PATENT DOCUMENTS

| | | |
|---|---|---|
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |

OTHER PUBLICATIONS

Wang, et al. (Oct. 2001). "Atomic Layer Deposition", Abstract, Solid-State and Intergrated-Circuit Technology, vol. 1, pp. 364.

Kikitsu, et al. (Sep. 2007). "Recent Progress of Patterned Media", IEEE Transactions on Magnetics, 43(9) 3685-3688.

Andrew M. Homola et al., U.S. Appl. No. 12/882,888, filed Sep. 15, 2010, 17 pages.

Andrew M. Homola, et al., U.S. Appl. No. 12/472,288, filed May 26, 2009, 14 pages.

Office Action dated Feb. 28, 2012 from U.S. Appl. No. 12/472,288, 18 pages.

Final Office Action dated Jul. 13, 2012 from U.S. Appl. No. 12/472,288, 13 pages.

* cited by examiner

ELECTRO-DEPOSITED PASSIVATION COATINGS FOR PATTERNED MEDIA

RELATED APPLICATION

This application is a divisional of U.S. patent application Ser. No. 12/472,288, filed May 26, 2009, which is hereby incorporated by reference in its entirety.

TECHNICAL FIELD

Embodiments described herein relate to the field of patterned media, and, in particularly, to electro-deposited passivation of pattern media.

BACKGROUND

Patterned media poses unique challenges to the tribological properties of hard disks because typical fabrication processes can involve producing topography (e.g., grooves) in the magnetic media layers. The non-planar media surface can adversely affect a disk drive's performance in terms of both head flyability and corrosion. In conventional hard disk media, the head flies over a very smooth surface and the magnetic layers, which are composite metal films, are capped with a thin diamond-like carbon (DLC) film to protect against corrosion. In patterned media, a DLC film is also typically required to cap the magnetic layers, but the presence of topography in the magnetic layers can result in poor conformal coverage (e.g., groove sidewalls and corners) resulting in inadequate corrosion performance.

In conventional fabrication process for patterned media, the DLC film is applied to the pattern features of the discrete track recording (DTR) disk, also referred to as discrete track media (DTM). One type of DTM structure utilizes a pattern of concentric discrete zones for the recording medium. When data are written to the recoding medium, the discrete magnetic areas correspond to the data tracks. The substrate surface areas not containing the magnetic material isolate the data tracks from one another. The discrete magnetic zones (also known as hills, lands, elevations, etc.) are used for storing data and the non-magnetic zones (also known as troughs, valleys, grooves, etc.) provide inter-track isolation to reduce noise. The lands have a width less than the width of the recording head such that portions of the head extend over the troughs during operation. The lands are sufficiently close to the head to enable the writing of data in the magnetic layer. Therefore, with DTM, data tracks are defined both physically and magnetically In conventional fabrication of DTM, the recessed (e.g., grooves) and non-recessed regions (e.g., lands) of the patterned area are coated at the same time using the same diamond-like carbon (DLC) deposition process. As a result, the coating of the recessed regions will be thinner and less uniform than the non-recessed regions because of shadowing effects and a larger surface area in the recessed regions. Consequently, the potential for corrosion in the recessed regions of the patterned media is greater than the non-recessed regions and likewise greater than standard non-patterned media.

One conventional DTM fabrication approach uses a physical vapor deposition (PVD) technique to coated the entire surface of patterned magnetic layer. Such an approach may involve multi-steps of depositing and etching back films to completely fill recessed regions of the patterned media and achieve a flyable surface.

Another conventional DTM fabrication method described in US 2008/0187779 utilizes atomic layer deposition (ALD) to deposit a DLC film over the entire surface of the patterned magnetic recording layer, after installing a resin mold mask on the surface of magnetic recording layer. The ALD fills not only the grooves but also covers the resin mold mask on the lands of the magnetic recording layer. Then, the resin mold mask is removed together with the ALD protective layer above the lands of the magnetic recording layer.

BRIEF DESCRIPTION OF THE DRAWINGS

Embodiments are illustrated by way of example, and not limitation, in the figures of the accompanying drawings in which.

DETAILED DESCRIPTION

Figure 1:
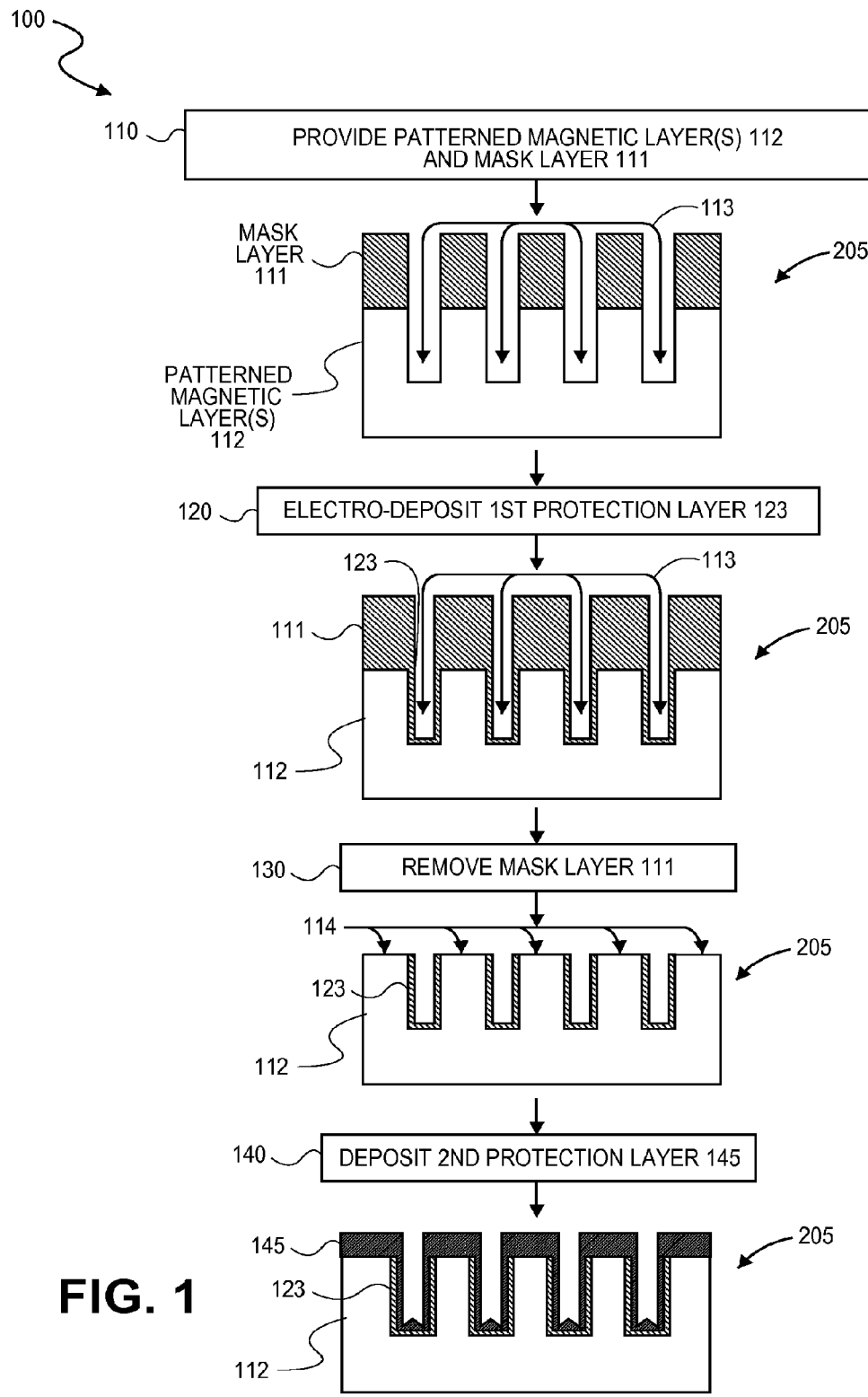
FIG. 1 is a conceptual illustration of the manufacturing method and resulting disk structure of a patterned magnetic recording disk having an electrodeposited protection layer, according to embodiments of the present invention.

Embodiments of the apparatus and methods are described herein with reference to figures. However, particular embodiments may be practiced without one or more of these specific details, or in combination with other known methods, materials, and apparatuses. In the following description, numerous specific details are set forth, such as specific materials, dimensions and processes parameters etc. to provide a thorough understanding. In other instances, well-known manufacturing processes and equipment have not been described in particular detail to avoid unnecessarily obscuring the claimed subject matter. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, materials, or characteristics may be combined in any suitable manner in one or more embodiments.

Embodiments of a method of electro-depositing a coating to reside in the recessed areas (grooves) of a patterned magnetic film are described. Electro-deposition of the coating in these topographical grooves may be performed in order to passivate the surfaces of these patterned grooves and prevent corrosion. In one particular embodiment, such a coating layer is only electro-deposited in the patterned grooves so that no additional spacing loss is added to the top magnetic surface. In one embodiment, depending on the coating layer thickness, the effect on head flyability can also be mitigated by either partially or completely filling the grooves to planarize the media. Improved corrosion performance as well as flyability of the patterned media may result from embodiments of the invention discussed herein.

In one embodiment, the electro-deposition process is performed after the features have been etched by some means into the media layers but before a mask layer is stripped so that only the exposed conductive surfaces are the recessed features. Consequently, material is only deposited in the recessed areas (i.e., grooves) of the patterned magnetic layers(s) during the electro-deposition process. After depositing the first coating in the etched features, the masking layer is then stripped and second protection layer (e.g., DLC film) can be deposited over the entire surface of the patterned magnetic layer(s). As a result, the recessed regions of the pattern will have two layers of protection (i.e., electro-deposited film and vacuum deposited DLC) while the non-recessed regions (i.e., lands) of the pattern will have only the second protection layer (e.g., the DLC film).

As one of ordinary skill in the art will appreciate, different deposition methods may provide distinct material properties of the deposited layer. For example, one of ordinary skill in the art would understand CVD carbon to have material properties that are distinct from PVD carbon. Thus, a CVD carbon layer would not be considered structurally equivalent to a PVD carbon layer. As another example, a DLC film formed by a CVD method is denser and harder than a DLC film formed by a sputtering method. ALD is similar in chemistry to CVD, except that the ALD reaction breaks the CVD reaction into two half-reactions, keeping precursor materials separate during the reaction. A layer produced by electro deposition has different material properties than a layer of produced by ALD. As such, embodiments of the deposition method may be discussed herein at times in reference to the physical properties of a layer produced by the particular deposition method as well as a description of the deposition process. In one embodiment, the electrodeposited layer may have a crystalline structure. Alternatively, the electrodeposited layer may have an amorphous structure.

FIG. 1 is a conceptual illustration of the manufacturing method 100 and resulting disk 205 structure of a patterned magnetic recording disk, according to embodiments of the present invention. Embodiments of the method of the present invention begin after patterning of the magnetic layer(s) of a DTM disk. The patterning may be accomplished by any one of several means (e.g., imprint lithography, e-beam lithography, ion beam etching, reactive ion etching, sputter etching, etc.) that are well known in the art; accordingly, a detailed discussion is not provided. After patterning of the magnetic layer(s) 112, a mask (e.g., resist) layer 111 may remain above the lands of the pattern. In embodiments where a mask layer does not remain after patterning of layer(s), the method 100 includes the deposition and etching of a mask layer to form openings above the grooves 113 of the magnetic layer(s) as illustrated in the FIG. 1. The deposition and etching of a mask layer is known in the art; accordingly, a detailed discussion is not provided herein.

After the patterned magnetic layer(s) 112 and mask layer 111 have been provided, operation 110, the method 100 then proceeds with electro-depositing a protection layer 123 within the grooves 113 of the patterned magnetic layer(s) 112, operation 120. Next, mask layer 111 is removed, operation 130, followed by the depositing of a second protection layer 145 over both the grooves 113 and lands 114 of the patterned magnetic layer(s) 112, step 140. Further details of each of the operations of FIG. 1 are provided below.

Figure 2:
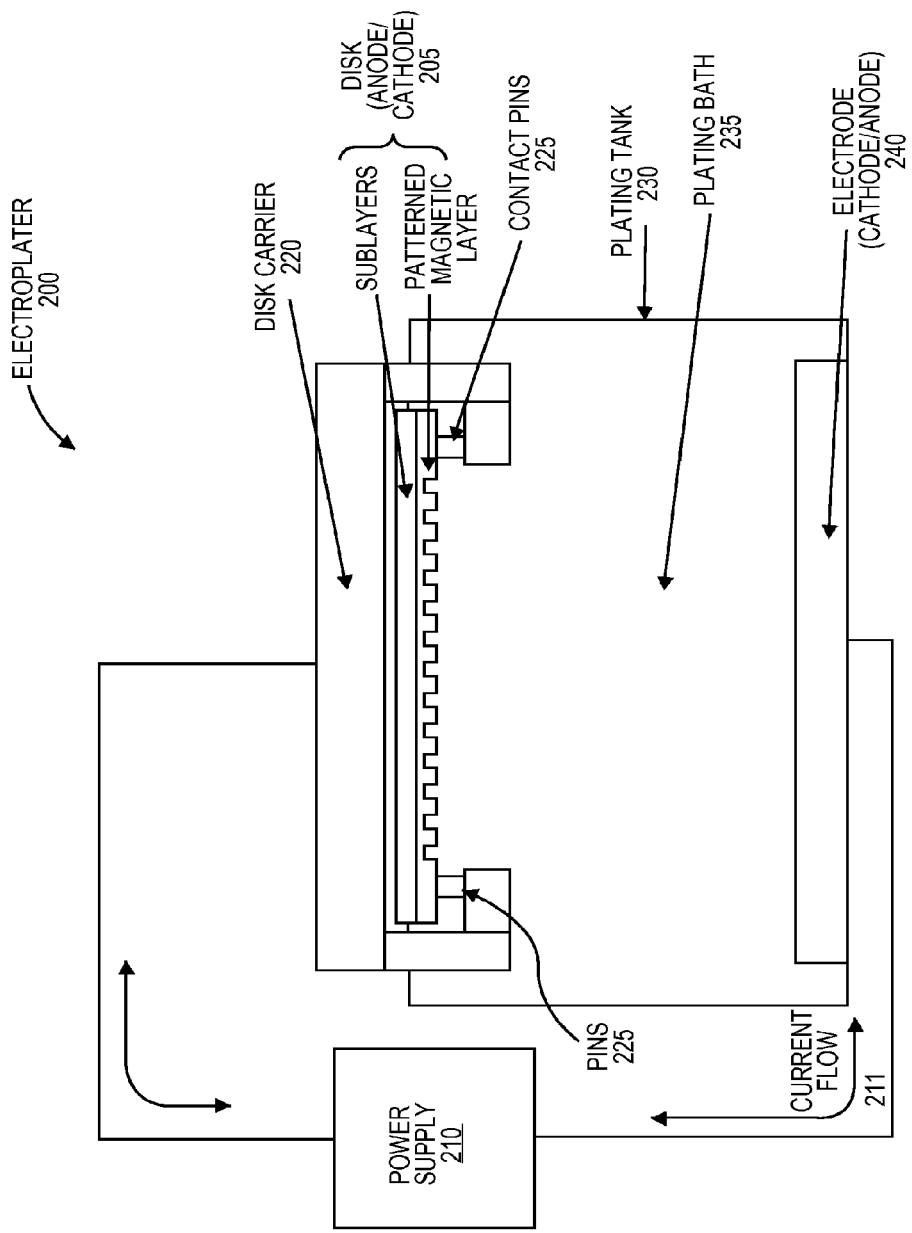
FIG. 2 illustrates one embodiment of electroplater according to one embodiment of the present invention.

FIG. 2 illustrates one embodiment of electroplater 200 that may be used in the electrodeposition operation 120 according to one embodiment of the present invention. Electroplater 200 includes a power supply 210 coupled to a disk carrier 220 and a plating tank 230, containing a plating bath 235, to provide an electric current flow 211 in order to electroplate the first protection layer on the patterned magnetic recording layer. Contact pins 225 are used to provide electrical contact to the disk 205. In this particular embodiment, disk 205 is held in the tank upside down by the disk carrier 220.

In the electro-deposition process, the disk 205 as a work piece is made into either an anode or a cathode depending on the material to be deposited. A wide variety of materials can be electrodeposited into the recessed areas of the magnetic recording pattern including both metals and insulators. The materials which can be electro-deposited in this fashion include, for example, metals such as Au or silicates such as sodium silicate ($Na_2SiO_3$), potassium silicate ($K_2SiO_3$). In one embodiment, the deposited film may be a cross-linked silicate (silica) film free of sodium or potassium. In the case of sodium silicate, the electro-deposited film can then be converted to silica by baking the coating after deposition, as illustrated by operation 120 in FIG. 1.

In alternative embodiments, other metallic materials such as aluminum (Al), gold (Au), chromium (Cr), ruthenium (Ru), platinum (Pt), rhodium (Rh) and Copper (Cu) may be used. In general, metals are not magnetically sensitive and provide good adhesion, corrosion resistance and mechanical strength can also be employed. In yet other embodiments, aluminates can also be used similarly as silicate to be electro chemically deposited to the recessed areas 113. It should be noted that alloys can also be employed for formation of the first protection layer 123. In addition, multiple materials can also be electro-deposited in sequence to obtain desired adhesion, corrosion resistance, and mechanical properties.

When metallic materials are to be deposited into the grooves 113, the disk 205 is made a cathode and the tank electrode 240 is made an anode. When silicates or aluminates are to be used, the disk 205 is made an anode and the tank electrode 240 is made a cathode. In one embodiment, the electro deposition is carried out in a DC mode. In alternative embodiments, other plating modes may be used, for example, a positively pulsed mode, or a reversely pulsed mode (positive and negative). It should be noted that other types and configurations of electroplaters may be used in alternative embodiments of the present invention. Electroplating equipment is known in the art; accordingly, a further discussion is not provided herein. In one embodiment, the electrodeposition operation may be performed using electroless plating techniques.

The thickness of the first protection layer 123 can be controlled so that the groove 113 depth can be controlled to render the disk good flyability as well as good corrosion resistance. In the case of the metal coatings, relatively thick coatings can be achieved to even planarize the patterned features. In the case of silicates or aluminates, the coating thickness is self-limiting because the coating becomes non-conductive after a few nm and the deposition process stops.

Parameters such as electroplating bath composition, temperature, pH, voltage, pulse time and frequency (if pulsed), deposition time, etc all should be controlled to obtain optimum film properties. In order to limit the deposited film into grooves, the resist on the land area is non-conductive according to one embodiment. This can be done through controlling the resist thickness or selecting resist of high electrical resistance.

Figure 3:
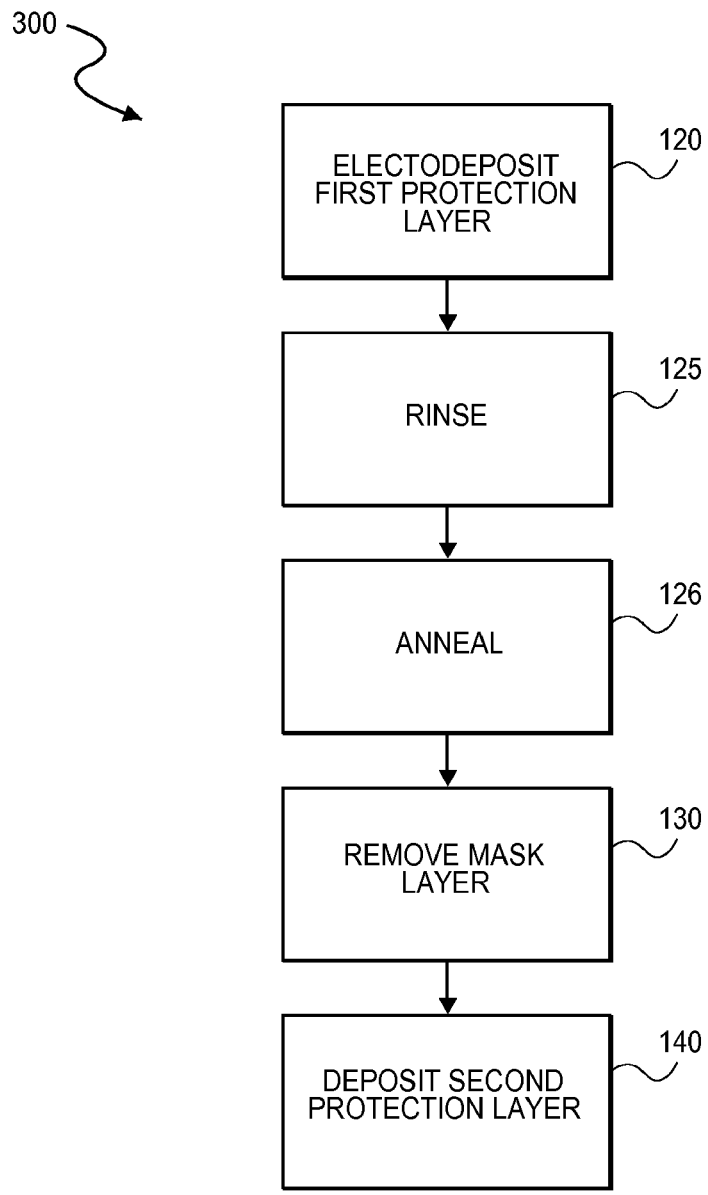
FIG. 3 illustrates a method of manufacturing a patterned magnetic recording disk having an electrodeposited protection layer, according to alternative embodiments of the present invention.

FIG. 3 illustrates a method 300 of manufacturing a patterned magnetic recording disk having an electrodeposited protection layer, according to alternative embodiments of the present invention. In one embodiment, one or more rinse operations, operation 125, (e.g., with water) may follow the electro-deposition operation 120 to clean the disk 205 free of possible loose deposits in the electrolytes. In one embodiment, an annealing operation 126 may be performed before the final stripping of mask layer in operation 130 to improve on the adhesion and mechanical properties of the electro deposited films. Annealing should not be too severe to hinder the final resist stripping operation. Rinse and annealing operations are known in the art; accordingly, detailed discussions of such operations are not provided.

Referring to both FIGS. 1 and 3, in operation 140, another, second protective film 145 may be deposited over the electrodeposited layer 123. In one embodiment, such additional protective layer 145 is vacuum deposited DLC film. In such vacuum deposited embodiments, the DLC film may be deposited with processes such as, but not limited to, ion beam deposition (IBD), physical vapor deposition (PVD), or chemical vapor deposition (CVD), such as low pressure (LP) CVD or plasma enhanced (PE) CVD. In a particular embodiments, the DLC film may be bi-layer formed. In alternative embodiments, other materials may be used for the second protection layer 145, for example, a nitride film, an oxide film such as $SiO_2$ film, etc.

Embodiments of the methods described above may be used to fabricate a DTR perpendicular magnetic recording (PMR) disk having a soft magnetic film disposed above a substrate. The soft magnetic film may be composed of a single soft magnetic underlayer (SUL) or multiple soft magnetic underlayers having interlayer materials, such as ruthenium (Ru), disposed there between. In particular embodiments, both sides of the substrate may be processed, in either simultaneous or consecutive fashion, to form disks with double sided DTR patterns.

The terms "over," "under," "between," and "on" as used herein refer to a relative position of one layer with respect to other layers. As such, for example, one layer deposited or disposed over or under another layer may be directly in contact with the other layer or may have one or more intervening layers. Moreover, one layer deposited or disposed between layers may be directly in contact with the layers or may have one or more intervening layers. In contrast, a first layer "on" a second layer is in contact with that second layer. Additionally, the relative position of one layer with respect to other layers is provided assuming the initial workpiece is a starting substrate and the subsequent processing deposits, modifies and removes films from the substrate without consideration of the absolute orientation of the substrate. Thus, a film that is deposited on both sides of a substrate is "over" both sides of the substrate.

Although these embodiments have been described in language specific to structural features and methodological acts, it is to be understood that the invention defined in the appended claims is not necessarily limited to the specific features or acts described in particular embodiments. The specific features and acts disclosed are to be understood as particularly graceful implementations of the claimed invention in an effort to illustrate rather than limit the present invention.

What is claimed is:

1. A method of fabricating a magnetic recording disk, comprising:
   providing a magnetic recording layer having a pattern of raised magnetic areas formed directly on a magnetic portion of the magnetic recording layer, wherein recessed areas are present between the raised magnetic areas;
   providing a mask layer on the raised magnetic areas of the magnetic recording layer;
   electrodepositing a first protection layer only in recessed areas of the magnetic recording layer;
   removing the mask layer; and
   depositing a second protection layer above the first protection layer.

2. The method of claim 1, wherein electrodepositing comprises electroplating.

3. The method of claim 1, the first protection layer comprises a metal.

4. The method of claim 1, wherein the first protection layer comprises aluminum.

5. The method of claim 1, wherein the first protection layer comprises a silicate.

6. The method of claim 1, wherein the first protection layer comprises an insulator.

7. The method of claim 6, further comprising baking the first protection layer after electrodepositing and before depositing the second protection layer.

8. The method of claim 1, where the first protection layer comprises an aluminate.

9. The method of claim 1, wherein the first protection layer comprises a material selected from a group consisting of aluminum, gold, copper, chromium, ruthenium, platinum and rhodium.

10. The method of claim 1, wherein after electroplating the method further comprises:
    rinsing the first protection layer; and
    annealing the first protection layer before removing the mask layer.

11. The method of claim 10, wherein the masking layer comprises a non-conductive material.

12. The method of claim 1, wherein the first protection layer has a thickness less than 1 micron.

13. The method of claim 1, further comprising electrodepositing one or more additional films on the first protection layer before depositing the second protection layer.

* * * * *